(12) United States Patent
Wu et al.

(10) Patent No.: US 8,190,008 B2
(45) Date of Patent: May 29, 2012

(54) IMAGE STABILIZATION DEVICE

(75) Inventors: Mu-Yuan Wu, Taipei (TW); Chien-Hsin Lu, Taipei (TW)

(73) Assignee: Ability Enterprise Co., Ltd., Taipei (TW)

(*) Notice: Subject to any disclaimer, the term of this patent is extended or adjusted under 35 U.S.C. 154(b) by 0 days.

(21) Appl. No.: 12/904,416

(22) Filed: Oct. 14, 2010

(65) Prior Publication Data
US 2012/0008208 A1 Jan. 12, 2012

(30) Foreign Application Priority Data
Jul. 7, 2010 (TW) .............................. 99122302 A

(51) Int. Cl.
*G03B 17/00* (2006.01)

(52) U.S. Cl. ...................................... 396/55; 348/208.4

(58) Field of Classification Search .................... 396/52, 396/55; 348/208.7, 208.11, 208.99, 208.2, 348/208.4
See application file for complete search history.

(56) References Cited

U.S. PATENT DOCUMENTS

| 5,973,319 | A * | 10/1999 | Washisu ................. 250/231.13 |
| 7,327,952 | B2 * | 2/2008 | Enomoto ........................ 396/55 |
| 7,574,123 | B2 * | 8/2009 | Nomura et al. ................. 396/55 |
| 7,580,621 | B2 * | 8/2009 | Nomura et al. ................. 396/55 |
| 2002/0037165 | A1 * | 3/2002 | Wada et al. ..................... 396/53 |
| 2002/0154223 | A1 * | 10/2002 | Moriya .................... 348/208.11 |
| 2007/0031134 | A1 * | 2/2007 | Kuroda et al. ................. 396/55 |
| 2007/0058958 | A1 | 3/2007 | Enomoto |
| 2009/0231709 | A1 | 9/2009 | Nomura et al. |

FOREIGN PATENT DOCUMENTS

| JP | 2008078852 A | 4/2008 |
| WO | 2009076477 A1 | 6/2009 |

OTHER PUBLICATIONS

European Search Report, EP 10187687, mailed Mar. 2, 2011.

* cited by examiner

*Primary Examiner* — Clayton E Laballe
*Assistant Examiner* — Warren Fenwick
(74) *Attorney, Agent, or Firm* — Stout, Uxa, Buyan & Mullins, LLP

(57) ABSTRACT

An image stabilization device is disclosed. The image stabilization device includes a first linkage assembly and a first flexible element. The first linkage assembly is disposed on a frame. The first linkage assembly includes a first linkage which is disposed in a first direction. The first flexible element is capable of pressing an optical element to the first linkage so as to make the optical element move along the first direction.

19 Claims, 3 Drawing Sheets

IMAGE STABILIZATION DEVICE

CROSS-REFERENCE TO RELATED APPLICATIONS

The entire contents of Taiwan Patent Application No. 099122302, filed on Jul. 7, 2010, from which this application claims priority, are incorporated herein by reference.

BACKGROUND OF THE INVENTION

1. Field of the Invention

The present invention generally relates to an image stabilization device, and more particularly to an image stabilization device which is applied in a picture capturing device.

2. Description of Related Art

With advances in technology, small digital cameras have become much more popular to the common consumer. While taking pictures, the quality of the picture may be affected by vibrations which are caused by hand tremor or breathing. Therefore, an image stabilization device able to prevent the quality of a picture from being affected by such vibrations has almost become a necessary function of the digital camera. The image stabilization device is not only applied in the digital camera. The image stabilization device can also be applied in digital products, such as mobile phones, personal digital assistants (PDAs), and so on.

The image stabilization device can compensate vibrations by moving the optical element so as to optimize the quality of the image. As the digital camera has become smaller, the image stabilization device must be smaller so as to meet consumer needs. However, the conventional image stabilization device has large volume, and the structure of the conventional image stabilization device is too complicated to have smaller volume.

For the reason that there are some disadvantages of the prior art mentioned above, there is a need to propose an image stabilization device so as to meet consumer needs.

SUMMARY OF THE INVENTION

Accordingly, the present invention has been made in order to meet such a need described above, and it is an object of the present invention to provide an image stabilization device so as to meet consumer needs.

In order to achieve the above object, the present invention provides an image stabilization device. The image stabilization device includes a first linkage assembly and a first flexible element. The first linkage assembly is disposed on a frame. The first linkage assembly includes a first linkage which is disposed in a first direction. The first flexible element is capable of pressing an optical element to the first linkage so as to make the optical element move along the first direction.

DETAILED DESCRIPTION OF THE INVENTION

The detailed description of the present invention will be discussed in the following embodiments, which are not intended to limit the scope of the present invention, and can be adapted for other applications. While drawings are illustrated in detail, it is appreciated that the quantity of the disclosed components may be greater or less than that disclosed, except where expressly restricting the amount of the components.

Figure 1:
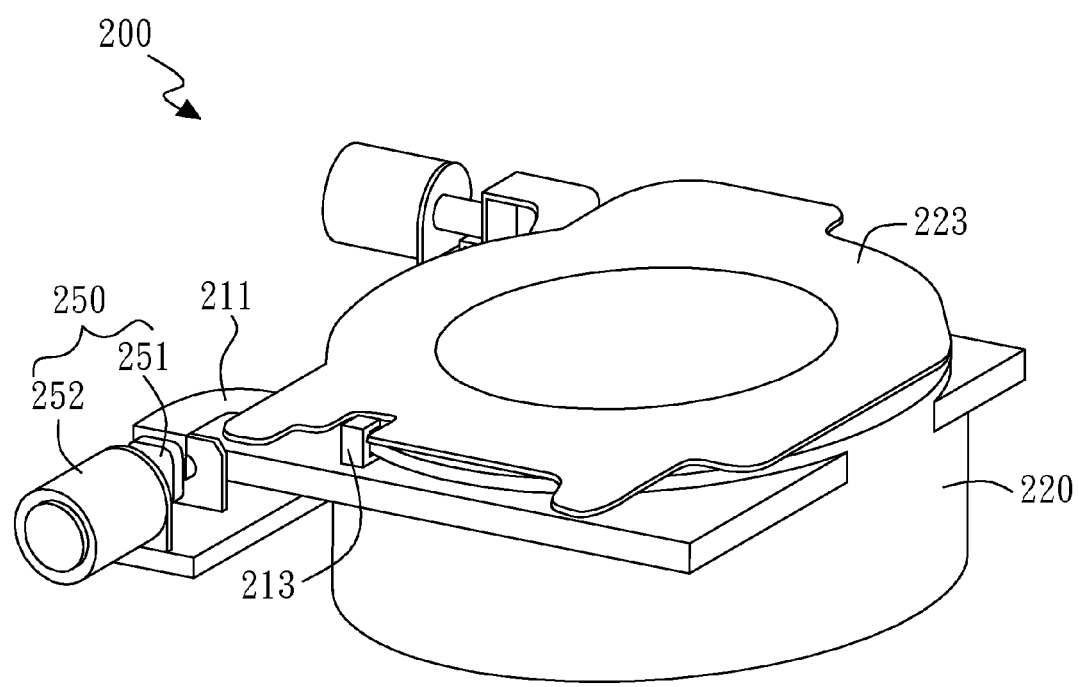
FIG. 1 and FIG. 2 show the perspective view and the top view, respectively, of an image stabilization device in accordance with an embodiment of the present invention.
Figure 2:
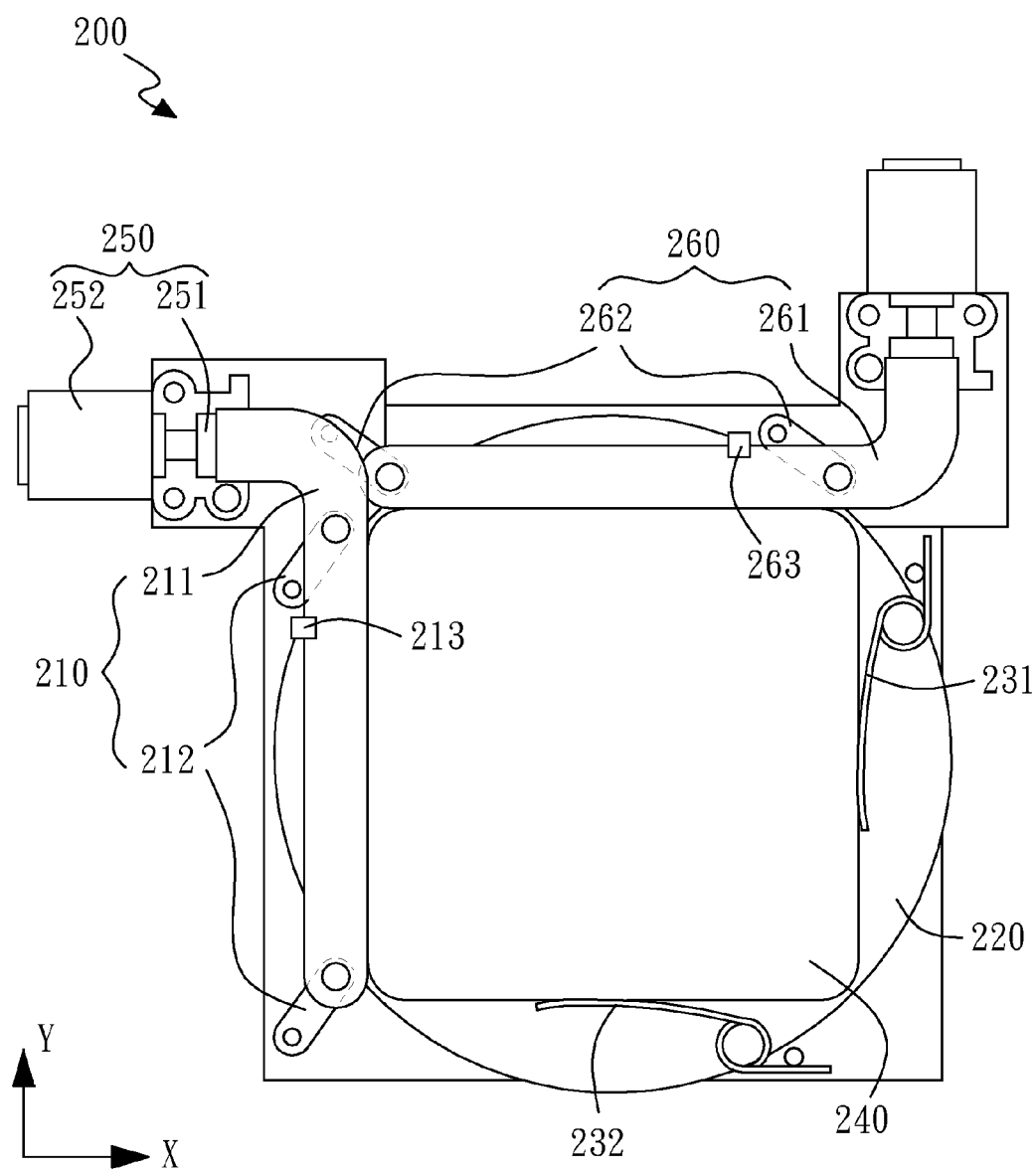

FIG. 1 and FIG. 2 show the perspective view and the top view, respectively, of an image stabilization device 200 in accordance with an embodiment of the present invention. Referring to FIG. 2, the image stabilization device 200 includes a first linkage assembly 210 and a first flexible element 231. The first linkage assembly 210 is disposed on a frame 220. The first linkage assembly 210 includes a first linkage 211 which is disposed in a first direction Y. The first flexible element 231 is capable of pressing an optical element 240 to the first linkage 211 so as to make the optical element 240 move along the first direction Y. When the first linkage 211 moves, the first linkage 211 is capable of pushing the optical element 240 along the second direction X, wherein the optical element 240 can be an image sensor or a lens assembly. Furthermore, referring to FIG. 1, the image stabilization device 200 can include a top cover 223, wherein the optical element 240 can slide between the top cover 223 and the frame 220.

According to this embodiment, the first linkage assembly 210 includes two second linkages 212. The second linkages 212 are pivotly connected with the first linkage 211 respectively, wherein the first linkage 211, the second linkages 212, and the frame 220 form a four-linkage mechanism. In this embodiment, the image stabilization device 200 can further include a power source 250. The power source 250 is capable of pushing the first linkage 211, wherein a sliding contact is performed between the power source 250 and the first linkage 211. The image stabilization device 200 can further include a first sensor 213 which is capable of detecting the position of the first linkage 211.

According to this embodiment, the image stabilization device 200 can further include a second linkage assembly 260 and a second flexible element 232. The second linkage assembly 260 is disposed on the frame 220. The second linkage assembly 260 includes a third linkage 261 which is disposed in the second direction X. The second flexible element 232 is capable of pressing an optical element 240 to the third linkage 261 so as to make the optical element 240 move along the second direction X. When the third linkage 261 moves, the third linkage 261 is capable of pushing the optical element 240 along the first direction Y, wherein the second direction X is vertical to the first direction Y. In this embodiment, the second linkage assembly 260 can include two fourth linkages 262. The fourth linkages 262 are pivotly connected with the third linkage 261 respectively, wherein the third linkage 261, the fourth linkages 262, and the frame 220 form a four-linkage mechanism. The image stabilization device 200 can further include a second sensor 263 which is capable of detecting the position of the third linkage 261.

By the design mentioned above, the image stabilization device 200 can compensate vibrations by moving the optical element 240 so as to optimize the quality of the image. The first flexible element 231 and the second flexible element 232 are capable of pressing the optical element 240 to the first linkage 211 and the third linkage 261 so as to make the optical element 240 move along the first direction Y and the second direction X. There is no need for the image stabilization device 200 of the present invention to use linear bearings or guiding rods for controlling the direction of the optical element 240. Thus, the image stabilization device 200 can have smaller volume.

Figure 3:
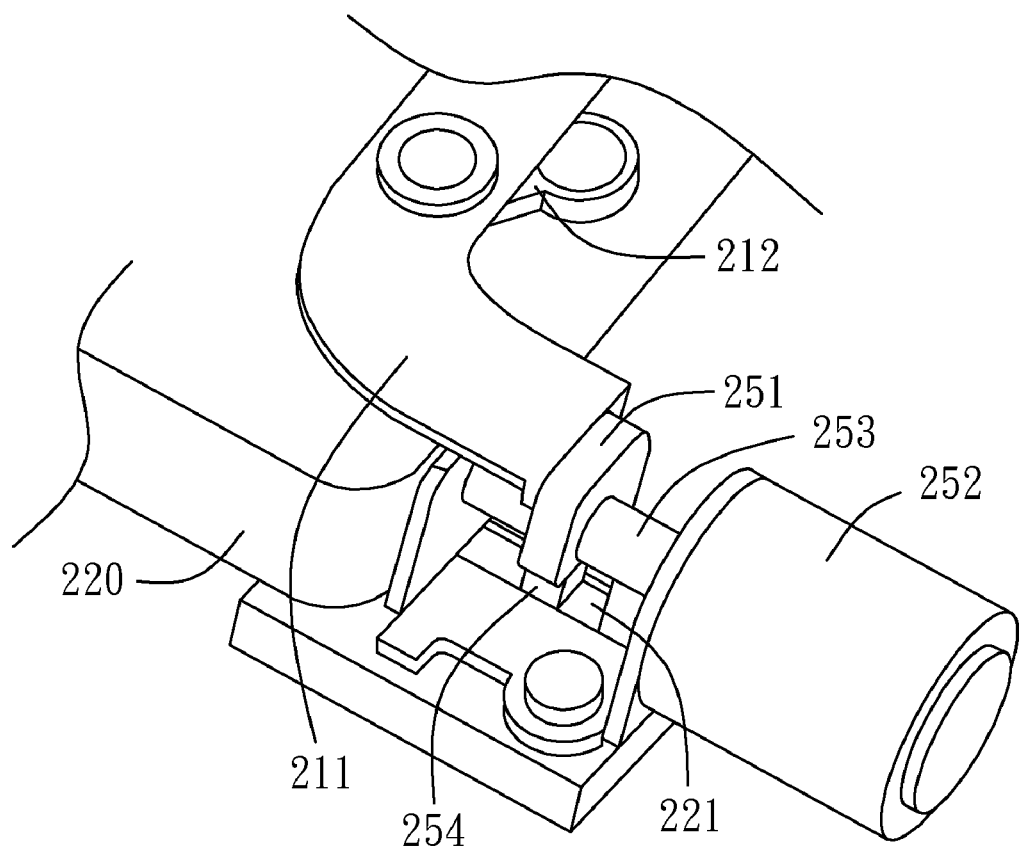
FIG. 3 shows the perspective view of the power source shown in FIG. 2.

FIG. 3 shows the perspective view of the power source 250 shown in FIG. 2. The power source 250 includes a sliding block 251 and a driving element 252. The sliding block 251 is connected with the driving element 252, and the driving element 252 pushes the first linkage 211 by the sliding contact between the sliding block 251 and the first linkage 211. Wherein the sliding block 251 includes a guiding portion 254, the frame 220 includes a guiding slot 221, and the guiding portion 254 is inserted into the guiding slot 221 so as to make the sliding block 251 be capable of moving linearly. According to this embodiment, the driving element 252 is a step motor, and the step motor includes a rotating shaft 253.

The rotating shaft 253 includes an outer screw thread, and the sliding block 251 includes an inner screw thread. The outer screw thread of the rotating shaft 253 is inserted into the inner screw thread of the sliding block 251. When the rotating shaft 253 rotates, the sliding block 251 is capable of moving linearly. The design of the power source 250 is not limited to this; the driving element 252 can be a linear motor or a solenoid which can perform linear motion.

Because there is no need for the image stabilization device 200 of the present invention to use linear bearings or guiding rods for controlling the direction of the optical element 240, the image stabilization device 200 can have smaller volume. Therefore, the digital camera having the image stabilization device 200 can also have smaller volume so as to meet consumer needs for smaller digital cameras.

Although specific embodiments have been illustrated and described, it will be appreciated by those skilled in the art that various modifications may be made without departing from the scope of the present invention, which is intended to be limited solely by the appended claims.

What is claimed is:

1. An image stabilization device, comprising:
a first linkage assembly, said first linkage assembly being disposed on a frame and comprising a first linkage disposed in a first direction and two second linkages pivotally connected with said first linkage respectively, wherein said first linkage, said second linkages, and said frame form a four-linkage mechanism; and
a first flexible element, said first flexible element being capable of pressing an optical element to said first linkage so as to make said optical element move along said first direction.

2. The image stabilization device according to claim 1, further comprising a power source, wherein said power source is capable of pushing said first linkage, and a sliding contact is performed between said power source and said first linkage.

3. The image stabilization device according to claim 2, wherein said power source comprises a sliding block and a driving element, said sliding block is connected with said driving element, and said driving element pushes said first linkage by said sliding contact between said sliding block and said first linkage.

4. The image stabilization device according to claim 3, wherein said sliding block comprises a guiding portion, said frame comprises a guiding slot, and said guiding portion is inserted into said guiding slot so as to move linearly.

5. The image stabilization device according to claim 3, wherein said driving element comprises a rotating shaft, said rotating shaft comprises an outer screw thread, said sliding block comprises an inner screw thread, and said outer screw thread is inserted into said inner screw thread, when said rotating shaft rotates, said sliding block is capable of moving linearly.

6. The image stabilization device according to claim 5, wherein said driving element is a step motor.

7. The image stabilization device according to claim 3, wherein said driving element comprises a linear motor or a solenoid.

8. The image stabilization device according to claim 1, further comprising a second linkage assembly and a second flexible element, said second linkage assembly being disposed on said frame, wherein said second linkage assembly comprises a third linkage disposed in a second direction, and said second flexible element is capable of pressing said optical element to said second linkage so as to make said optical element move along said second direction.

9. The image stabilization device according to claim 8, wherein said second direction is vertical to said first direction.

10. The image stabilization device according to claim 1, wherein said optical element comprises an image sensor or a lens assembly.

11. An image stabilization device for an optical component, comprising:
a first linkage assembly, disposed on a frame and comprising a first linkage disposed in a first direction and leant against a first side of said optical component; and
a first flexible element, leaning against a second side of said optical component opposite to said first side.

12. The image stabilization device according to claim 11, wherein said first linkage assembly further comprises two second linkages pivotally connected with said first linkage respectively, and said first linkage, said second linkages, and said frame form a four-linkage mechanism.

13. The image stabilization device according to claim 11, further comprising a power source, wherein said power source is capable of pushing said first linkage, and a sliding contact is performed between said power source and said first linkage.

14. The image stabilization device according to claim 13, wherein said power source comprises a sliding block and a driving element, said sliding block is connected with said driving element, and said driving element pushes said first linkage by said sliding contact between said sliding block and said first linkage.

15. The image stabilization device according to claim 14, wherein said sliding block comprises a guiding portion, said frame comprises a guiding slot, and said guiding portion is inserted into said guiding slot so as to move said sliding block linearly.

16. The image stabilization device according to claim 14, wherein said driving element comprises a rotating shaft, said rotating shaft comprises an outer screw thread, said sliding block comprises an inner screw thread, and said outer screw thread is inserted into said inner screw thread, when said rotating shaft rotates, said sliding block moves linearly.

17. The image stabilization device according to claim 11, further comprising a second linkage assembly and a second flexible element, wherein said second linkage assembly is disposed on said frame and comprises a third linkage disposed in a second direction, and said second flexible element is capable of pressing said optical component to said second linkage assembly so as to make said optical component move along said second direction.

18. The image stabilization device according to claim 17, wherein said second direction is vertical to said first direction.

19. The image stabilization device according to claim 11, wherein said optical component is capable of moving along said first direction, and a driving force is exerted to said first linkage for moving said optical component along a second direction orthogonal to said first direction.

* * * * *